United States Patent [19]

Goel et al.

[11] Patent Number: 4,754,057

[45] Date of Patent: Jun. 28, 1988

[54] CONVERSION OF POLYCARBOXYLIC ACIDS TO POLYOLS BY REACTION WITH BICYCLIC AMIDE ACETALS

[75] Inventors: Anil B. Goel, Worthington; Harvey J. Richards, Columbus, both of Ohio

[73] Assignee: Ashland Oil, Inc., Ashland, Ky.

[21] Appl. No.: 682,444

[22] Filed: Dec. 17, 1984

[51] Int. Cl.$^4$ ............................................. C07C 67/24
[52] U.S. Cl. ...................................... 560/196; 560/88
[58] Field of Search ................ 560/196, 88; 260/404, 260/404.5

[56] References Cited

U.S. PATENT DOCUMENTS

| | | | |
|---|---|---|---|
| 3,507,830 | 4/1970 | Feinauer | 528/183 |
| 3,699,154 | 10/1972 | Heintzelman et al. | 560/196 |
| 3,907,863 | 1/1975 | Voss | 560/196 X |
| 4,065,627 | 12/1977 | Harrison | 560/196 X |

FOREIGN PATENT DOCUMENTS 1551716  11/1968  France .

Primary Examiner—Werren B. Lone
Assistant Examiner—Vera C. Clarke
Attorney, Agent, or Firm—John F. Jones

[57] ABSTRACT

A process for preparing polyols from polycarboxylic acids by the reaction of a bicyclic amide acetal with a polycarboxylic acid is described.

5 Claims, No Drawings

CONVERSION OF POLYCARBOXYLIC ACIDS TO POLYOLS BY REACTION WITH BICYCLIC AMIDE ACETALS

This invention relates to the production of polyols from polycarboxylic acids and bicyclic amide acetals and more particularly pertains to a process for reacting di-and poly-carboxylic acids with bicyclic amide acetals to form the corresponding hydroxy-amide-esters.

Bicyclic amide acetals are known and they have been said to react with mono-carboxylic acids to form an amide diester product [Angew Chem 79, 189 (1967)].

Di-and poly-carboxylic acid monomers, oligomers, prepolymers and polymers employed in the condensation polymer technology are well known. The conversion of the carboxylic acid groups (terminal groups) of these materials to hydroxyl groups has previously been done by reaction with polyols, epoxides, etc. The reaction with polyols is time consuming and usually requires heating, removal of the water of reaction, and other inconveniences. In such a process, the conversion of carboxylic acid groups to hydroxyl groups is often not favorable so that the products still possess relatively high acid numbers which are undesirable, for instance, in the utilization of such materials for polyurethane synthesis.

We have discovered that di- and poly-carboxylic acids can be essentially completely converted to hydroxyl compounds in a clean, low temperature, short reaction time process which is devoid of the evolution of any by-product. The resulting di-and poly-hydroxyl compounds are useful in the formation of polyurethanes and other condensation products normally based on a di-or polyhydroxy compound reactant.

The bicyclic amide acetals useful in this invention are those having Formula I:

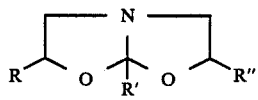

I

Wherein R represents hydrogen or an alkyl group having from 1 to 18 carbon atoms, R' represents hydrogen or a hydrocarbon group having from 1 to 20 carbon atoms, and R" represents hydrogen, a hydrocarbon or ether group having from 1 to 18 carbon atoms.

The polycarboxylic acids useful in this invention are those having the formula $Y(COOH)_n$ wherein Y is a hydrocarbon group having at least 1 carbon atom and preferably from 1 to 20 carbon atoms, and Y can also contain one or more functional groups such as ether, ester, amide, and the like, Y can also contain olefinic and aromatic unsaturated moieties. n must be at least 2 in the carboxylic acids embodied in the formula.

Specific types of polycarboxylic acids which are useful in this invention include adipic, dodecanedioic, terephthalic, succinic, maleic, fumaric, dimerized and trimerized linoleic acid, polymers containing multiple carboxyl groups, and the like.

The reaction between the bicyclic amide acetal and a polycarboxylic acid can be illustrated as follows wherein bicyclic amide acetal and adipic acid are used as reactants:

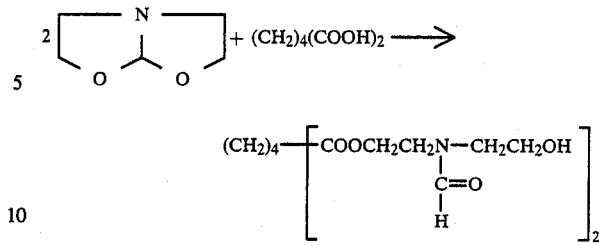

The reaction between the bicyclic amide acetal and the polycarboxylic acid is usually exothermic and will proceed in a few minutes to a few hours at a temperature in the range of from about 0° to 150° C. and preferably from about 25° C. to 110° C. The reaction should be carried out under anhydrous conditions because the bicyclic amide acetal will also react readily with water. In the process of this invention, it is preferred that about one mole of bicyclic amide acetal be used per carboxylic acid equivalent weight of the polycarboxylic acid.

The process of this invention is further illustrated in the following representative examples.

EXAMPLE 1

To 23.0g of dodecanedioic acid was added 26.0g of bicyclic amide acetal of Formula I in which R and R" is H and R' is —CH$_3$. An exothermic reaction occurred. The mixture was stirred for about one hour at 65° C. to give a pale colored clear viscous liquid. The infrared spectrum of the product showed the presence of ester groups (1738 cm$^{-1}$), amide groups (1637 cm$^{-1}$) and hydroxyl groups (3400 cm$^{-1}$) showing it to be a diol with amide and ester groups. The hydroxyl number of the product was found to be 225.

EXAMPLE 2

This experiment was carried out exactly as in Example 1 except that 17.6g of adipic acid was used in place of the dodecanedioic acid. The resulting liquid diol product was found by analysis to contain amide, ester and hydroxyl groups with a hydroxyl number of 272.

EXAMPLE 3

Dimerized linoleic acid (equivalent weight of 290) (147.1g) was mixed with the bicyclic amide acetal described in Example 1 (67.8g.) and stirred at 100° C. for 4 hours under a nitrogen atmosphere to give a clear, viscous liquid product having an acid value of 0.3. Infrared analysis of this product showed the presence of hydroxyl groups (3400 cm$^{-1}$), ester groups (1738 cm$^{-1}$) and amide groups (1632 cm$^{-1}$) The hydroxyl number of the product was found to be 136.

EXAMPLE 4

This Example demonstrates the formation of a diol which contains ether, ester, amide and hydroxyl groups.

A polyether diol [poly (tetramethylene ether) diol, equivalent weight of 492] (481.2 g) was allowed to react with 100 g of succinic anhydride at about 80° C. in the presence of 0.5 g of p-toluene sulfonic acid catalyst for about an hour to give a viscous product. The infrared spectrum of this product showed that it was a dicarboxylic ester having an acid value of 99.15. This product (169.8 g was treated with the bicyclic amide acetal described in Example 1 (39.69) at 85° C. for about 2 hours with stirring. The resulting viscous liquid was found to have an acid value of 2.27. This low acid value was further reduced by capping the remaining carboxyl groups with 1.2 g of additional bicyclic amide acetal at 85° C. for an additional 2 hours. The final product was found by analysis to have an acid value of only 0.24, and to contain hydroxyl groups, ester groups, amide groups by infrared analysis.

EXAMPLE 5

A carboxylic acid terminated polybutadiene having a molecular weight of about 4200 (174.6 g) was placed in a three-necked flask equipped with mechanical stirrer, thermometer, temperature controller, water condenser and nitrogen inlet. To this was added 22.5 g of the bicyclic amide acetal described in Example 1. The resulting reaction mixture was heated at 85° C. with stirring for 3 hours. The cooled viscous liquid was found to have an acid value of 0.2 and an hydroxyl number of 25.6.

EXAMPLE 6

This experiment was carried out as in Example 5 except that 153.8 g of dimerized linoleic acid having an equivalent weight of 290 was used in place of the carboxylic terminated butadiene polymer and 71.8 g of the bicyclic amide acetal were used. The viscous liquid product was found to contain amide, ester and hydroxyl groups and had a hydroxyl number of 140.8.

EXAMPLE 7

This Example illustrates the use of the diols of this invention in the polyurethane polymers formation.

The diol obtained in Example 6 (80 g) was mixed with 27 g of butane diol for better fluidity. The mixture was degassed on a rotary evaporator and mixed with 120 g of degassed liquified 4,4'-methylene bis(phenyl isocyanate). The mixture was poured into a mold formed by the glass plates separated by ⅛ inch spacers. This was placed in an oven at 100° C. for 1 hour followed by at 130° C. for 2 hours to give a white opaque polymeric material with heat distortion temperature (ASTM-D648) about 120° C. and notched izod impact (ASTM 246) about 0.85 foot pounds/inch of notch.

We claim:

1. The process for preparing polyols from polycarboxylic acids comprising reacting a polycarboxylic acid conforming to the formula $Y(COOH)_m$ wherein Y represents a hydrocarbon group having at least one carbon atom and can contain one or more functional groups selected from the group consisting of ether, ester, and amide groups and Y can also contain olefinic and aromatic moieties, and m is a number of at least 2, with a bicyclic amide acetal having the formula

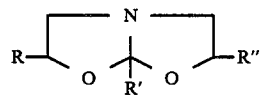

wherein R represents hydrogen or an alkyl group having from 1 to 18 carbon atoms, R' represents hydrogen or a hydrocarbon group having from 1 to 20 carbon atoms, and R" represents hydrogen, a hydrocarbon or ether group having from 1 to 18 carbon atoms under substantially anhydrous conditions at a temperature in the range of from 0° C. to 150° C.

2. The process of claim 1 wherein the bicyclic amide acetal is one in which R and R" are hydrogen and R' is —CH₃ and the polycarboxylic acid is dodecanedioic acid.

3. The process of claim 1 wherein the bicyclic amide acetal is one in which R and R" are hydrogen and R' is —CH₃ and the polycarb.oxylic acid is dimerized linoleic acid.

4. The process of claim 1 wherein the bicyclic amide acetal is one in which R and R" are hydrogen and R' is —CH₃ and the polycarboxylic acid is one produced by reacting the end hydroxyl groups of a poly(tetramethylene ether) diol with succinic anhydride.

5. The process of claim 1 wherein the bicyclic amide acetal is one in which R and R" are hydrogen and R' is —CH₃ and the polycarboxylic acid is a carboxylic acid terminated polybutadiene.

* * * * *